US009989171B2

(12) United States Patent
Beelen et al.

(10) Patent No.: US 9,989,171 B2
(45) Date of Patent: Jun. 5, 2018

(54) LIFTING DEVICE

(75) Inventors: Paul G. L. Beelen, Schoten (BE);
Ward P. M. Rombouts, Antwerp (BE)

(73) Assignee: B&R ENGINEERING BVBA,
Antwerp (BE)

( * ) Notice: Subject to any disclaimer, the term of this patent is extended or adjusted under 35 U.S.C. 154(b) by 451 days.

(21) Appl. No.: 13/978,560

(22) PCT Filed: Dec. 28, 2011

(86) PCT No.: PCT/BE2011/000072
§ 371 (c)(1),
(2), (4) Date: Oct. 4, 2013

(87) PCT Pub. No.: WO2012/092650
PCT Pub. Date: Jul. 12, 2012

(65) Prior Publication Data
US 2014/0021420 A1    Jan. 23, 2014

(30) Foreign Application Priority Data
Jan. 6, 2011    (BE) .................................... 2011/0004

(51) Int. Cl.
*F16L 3/24* (2006.01)
*F16B 2/12* (2006.01)
*F16L 3/20* (2006.01)

(52) U.S. Cl.
CPC .................. *F16L 3/24* (2013.01); *F16B 2/12* (2013.01); *F16L 3/20* (2013.01)

(58) Field of Classification Search
CPC ....... F16B 2/12; F16L 3/25; F16L 3/20; F16L 3/24; B66F 2700/052; B66F 2700/04; B66F 3/242
See application file for complete search history.

(56) References Cited

U.S. PATENT DOCUMENTS 1,474,059 A    11/1923    Voellmecke
1,976,595 A *  10/1934    Asleson .................. E04G 17/18
                                                                24/569
(Continued)

FOREIGN PATENT DOCUMENTS

DE    202008006935 U1    8/2008
DE    102008015392 A1 *  9/2008  ............. B66C 1/125
(Continued)

OTHER PUBLICATIONS

International Search Report issued from corresponding PCT/BE2011/000072, dated May 24, 2012.

*Primary Examiner* — Christopher M Koehler
*Assistant Examiner* — Joel Crandall
(74) *Attorney, Agent, or Firm* — Banner & Witcoff, Ltd.

(57) ABSTRACT

Lifting device (1) suitable for lifting a tube or pipeline (25) with respect to a supporting girder (26) with an H profile or I profile, whereby the lifting device (1) at least contains the following elements: —a supporting body (2); —gripping means (3) on the supporting body (2) that can grip over opposite side edges (30,32) of a free flange (30) of the girder (26), and with which the supporting body (2) can be suspended from this free flange (30) of the girder (26) with an H profile or I profile; and, —lifting means (4) provided on the supporting body (2) on either side of the gripping means (3), with which the tube or pipeline (25) can be lifted with respect to the supporting body (2).

15 Claims, 10 Drawing Sheets

(56) References Cited

U.S. PATENT DOCUMENTS

| | | | | | |
|---|---|---|---|---|---|
| 2,375,513 | A | * | 5/1945 | Bach | F16L 3/221 248/59 |
| 2,470,992 | A | * | 5/1949 | Kindorf | F16L 3/24 248/72 |
| 2,903,258 | A | * | 9/1959 | Jovanovich | B25H 1/0007 248/176.1 |
| 3,417,951 | A | * | 12/1968 | Rebentisch, Jr. | F16L 3/127 248/62 |
| 3,660,871 | A | * | 5/1972 | Boyle, Jr. | E04G 5/06 182/113 |
| 3,960,350 | A | * | 6/1976 | Tardoskegyi | F16L 3/14 248/589 |
| 4,826,113 | A | * | 5/1989 | Winters | F16L 3/24 248/228.3 |
| 7,000,730 | B1 | * | 2/2006 | Ostrobrod | A62B 1/04 182/3 |
| 2004/0195479 | A1 | * | 10/2004 | Gulley | F16B 2/12 248/228.1 |
| 2007/0163834 | A1 | * | 7/2007 | Casebolt | A62B 35/0068 182/3 |
| 2009/0159759 | A1 | * | 6/2009 | Ansperger | F16L 3/24 248/72 |

FOREIGN PATENT DOCUMENTS

| | | | | |
|---|---|---|---|---|
| EP | 0801257 | A1 | 10/1997 | |
| FR | 2400130 | A1 | 3/1979 | |
| GB | 637657 | A * | 5/1950 | F16L 3/10 |
| GB | 2318109 | A * | 4/1998 | F16L 3/01 |
| GB | 2403443 | A * | 1/2005 | B23K 37/0435 |
| WO | 20041102758 | A1 | 11/2004 | |
| WO | WO 2008003158 | A1 * | 1/2008 | B66F 3/00 |

\* cited by examiner

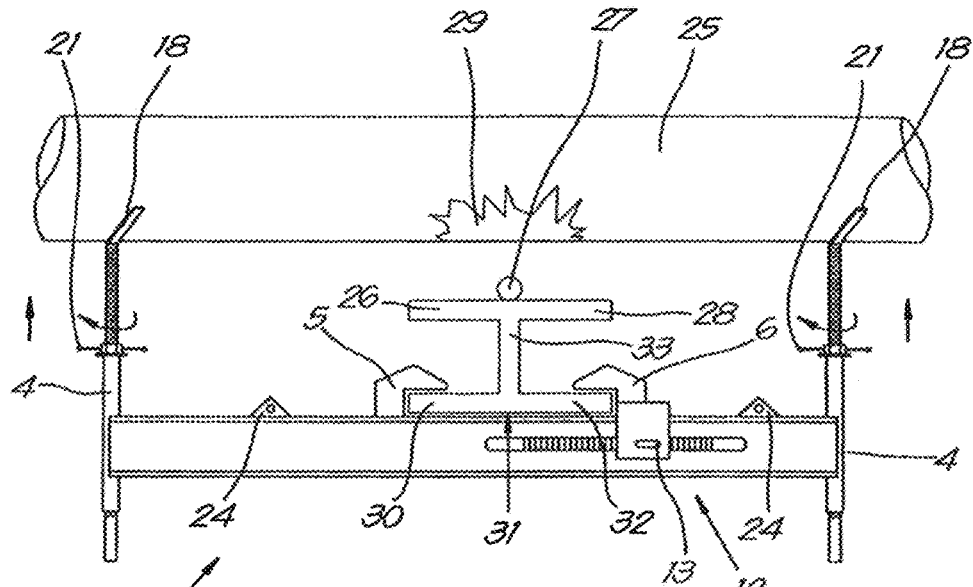
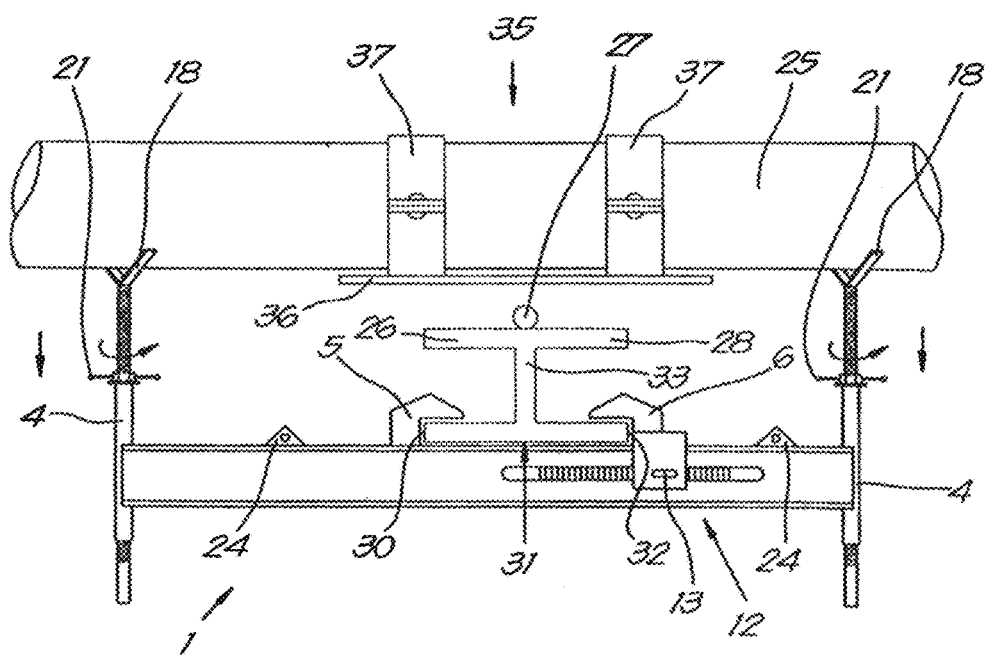

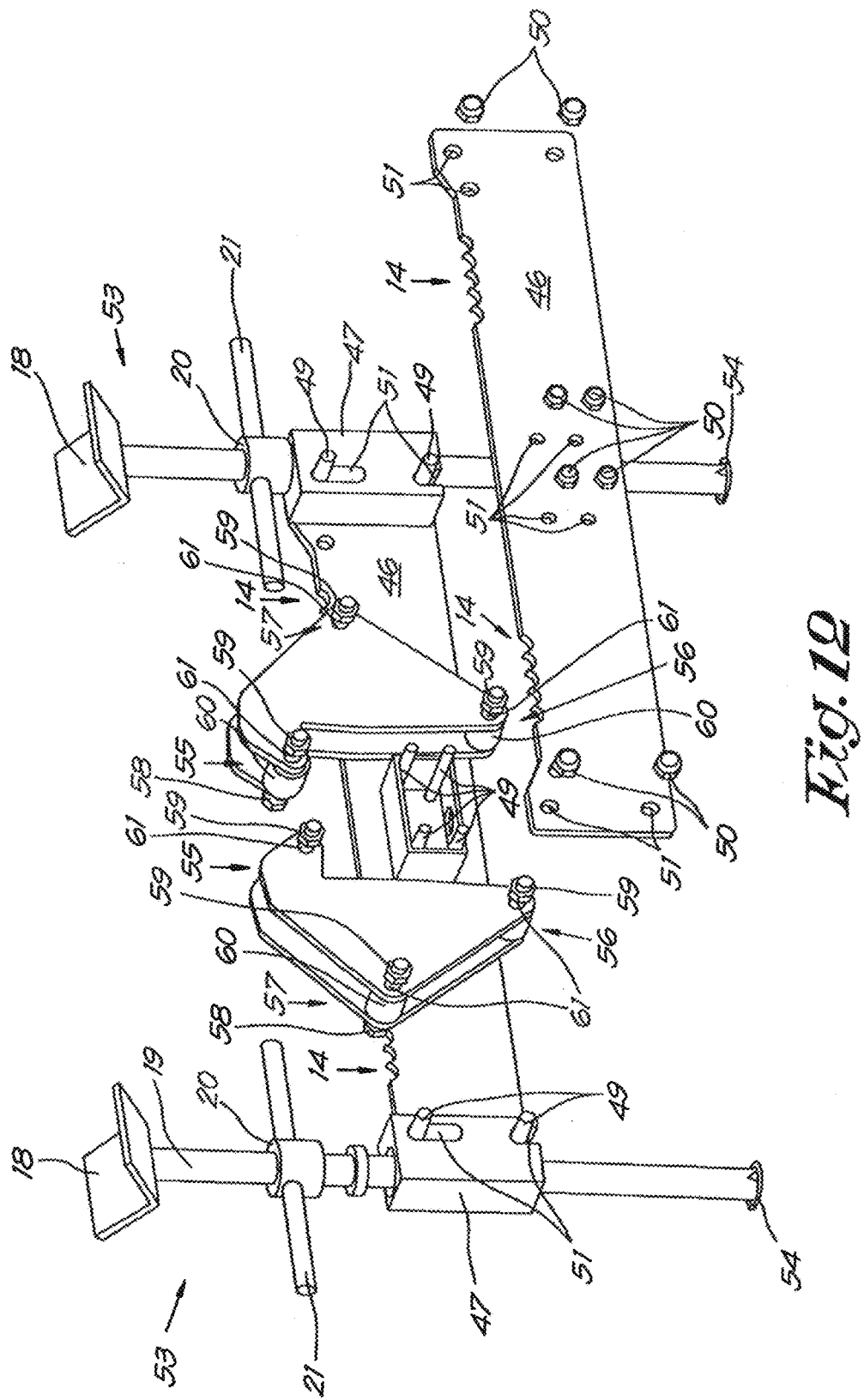

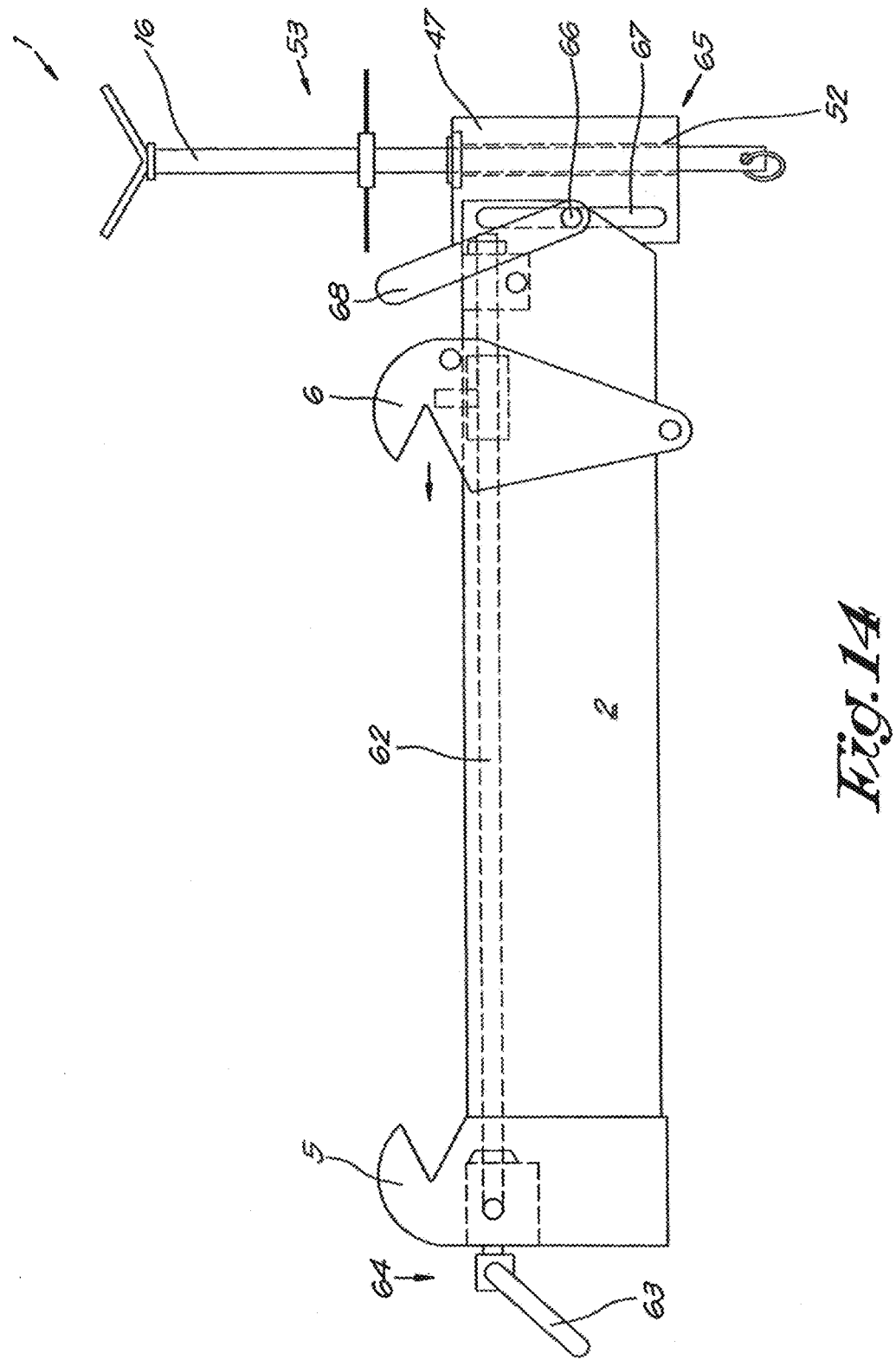

LIFTING DEVICE

RELATED APPLICATION DATA

This application is a National Stage Application under 35 U.S.C. 371 of co-pending PCT Application PCT/BE2011/000072, designating the United States and filed Dec. 28, 2011, titled "Lifting Device", which claims the priority benefit of BE Patent Application No. 2011/0004, filed Jan. 6, 2011, titled "Lifting Device", the priority benefit of each of which is claimed and the entire disclosure of each of which is hereby incorporated by reference for all purposes.

The present invention relates to a lifting device.

More specifically the present invention relates to a lifting device that is suitable for lifting a tube or pipeline with respect to a supporting girder with an H profile or I profile.

Indeed it is known in industry, and more specifically in the chemical industry in particular, entire company sites are equipped with kilometers of pipelines for the supply and removal of liquid or gaseous products between parts of the site that may or may not be located far away from one another.

The pipelines are hereby affixed on a supporting construction whereby in most cases they rest on steel transverse girders with an H-shaped or I-shaped transverse section.

A big problem with such pipelines is that the pipeline expands and contracts as a result of temperature fluctuations, resulting in a change to the length of the pipeline.

Such temperature changes are in fact very frequent, for example as a result of weather conditions or the difference in temperature between night and day, or simply by a change of temperature of the liquid or gas in the pipeline.

The total change of length as a result of the temperature change increases with the length of the pipeline, which can for example easily rise to a change of length of the pipeline of 20 to 30 cm per day.

A consequence of this change of length of a pipeline is that at least certain sections of such a pipeline undergo a relative movement with respect to a fixed base or support.

Certain sections of the pipeline thus also undergo a movement with respect to the fixed steel supporting girders, or in other words the pipeline is supported by the contact of certain sections of the pipeline with the transverse girders, whereby different sections of the pipeline always fulfil this function during the expansion and contraction of the pipeline.

This phenomenon generally generates an enormous amount of friction, for example on account of the weight of the pipeline, or for example due to the sharp form of the support or the small contact area with the support.

According to an incorrect belief, which is very widely held, the friction between a pipe and a transverse beam can be reduced by reducing the contact area between the pipeline and the girders, for example by affixing narrow ribs or round bars to the girders.

In reality such facilities only make the situation worse and the risk of damage and similar to the tubes or pipeline only becomes greater as a result.

Consequently damage to pipelines and leaks in the pipelines due to wear, corrosion and/or erosion are thus problems that occur very frequently.

Hence, in certain companies there are teams that permanently inspect the pipelines, detect damage, measure the wall thickness of the pipelines with specialised equipment and do any necessary repairs.

During such an inspection or wall thickness measurement it is often necessary to lift the pipeline with respect to the support.

Also when a pipeline has to be repaired, the lifting of the pipeline can scarcely be ruled out.

Indeed, a part often has to be removed from the pipeline and replaced by another part.

In some cases, 'pipe shoes' are installed preventively at the location of the girders, in order to protect the pipeline during the movement over the support.

The fitting of such pipe shoes is again coupled with the lifting of the pipeline with respect to the supporting girder.

Many lifting devices for lifting a pipeline with respect to a supporting girder are already known, but they are far from efficient, and the use of them requires a lot of time, suitable personnel and is very expensive.

For example, such lifting devices consist of a gantry or hoist that is constructed over the pipeline and from which a chain block or pulley is suspended with which the pipeline is lifted.

A first big disadvantage of these known lifting devices is that they are rather problematic with regard to safety, for example because many components and factors affect the stability and strength of the gantry.

Another big disadvantage of such lifting devices is that depending on the situation, they have to be adapted according to the specific case each time, which generally can only be done after a strength calculation by specialised personnel.

The materials used for such arrangements are generally subject to strict quality conditions for safety reasons, such that they are often expensive.

Moreover, for the same reason they have to be subject to regular quality controls.

It is also clear that the assembly and dismantling of gantrys and hoists is a tough job that requires such a lot of time, with high costs as a result.

Of course other lifting devices of the motorised or automated type are known, whereby it is possible to lift pipelines, for example in the form of cranes, forklift trucks, forklifts and similar.

An advantage of these lifting devices is that no appreciable human muscle power is required to lift the pipeline.

However, a disadvantage of these lifting devices is that they are expensive and that they can often not be taken to difficult-to-access pipelines, for example due to the absence of roads for moving such a lifting device to the place concerned, or because the pipeline is too high or located between other pipelines, such that it is difficult to reach.

The purpose of the present invention is to provide a solution to the aforementioned and any other disadvantages.

To this end the present invention concerns a lifting device suitable for lifting a tube or pipeline with respect to a supporting girder with an H profile or I profile, whereby the lifting device at least contains the following elements:

a supporting body;

gripping means on the supporting body that can grip over opposite side edges of a free flange of the girder, and with which the supporting body can be suspended from this free flange of the girder with an H profile or I profile; and, lifting means provided on the supporting body on either side of the gripping means with which the tube or pipeline can be lifted with respect to the supporting body.

An advantage of such a lifting device according to the invention is that it can be installed in no time at all on an underlying girder with an H profile or I profile of a pipeline, by making the gripping means grip over the free flanges of the girder.

An additional advantage is that the installation of the lifting device and the further lifting of the pipeline with the lifting means can be easily done by one person.

Hereby use is made of the underlying construction such that no extra gantrys and/or hoists are needed that are constructed around and above the pipeline.

As in principle the support has already been calculated for the load by the pipeline, the lifting device according to the invention can also be applied straightaway without a strength calculation first having to be done by specialised personnel.

Another advantage of a lifting device according to the invention is that it can be used much more safely than the known lifting devices.

With the intention of better showing the characteristics of the invention, a preferred embodiment of a lifting device according to the invention is described hereinafter by way of an example, without any limiting nature, with reference to the accompanying drawings, wherein:

FIG. 1 shows a view in perspective of a possible embodiment of a lifting device according to the invention;

FIGS. 2 to 8 inclusive show a side view of successive steps during the repair of a pipeline using a lifting device according to FIG. 1;

FIGS. 12 and 13 show a view in perspective of another embodiment of a lifting device according to the invention, respectively in a disassembled state and assembled state; and, FIG. 14 shows a side view of another variant of a lifting device according to the invention.

Figure 1:
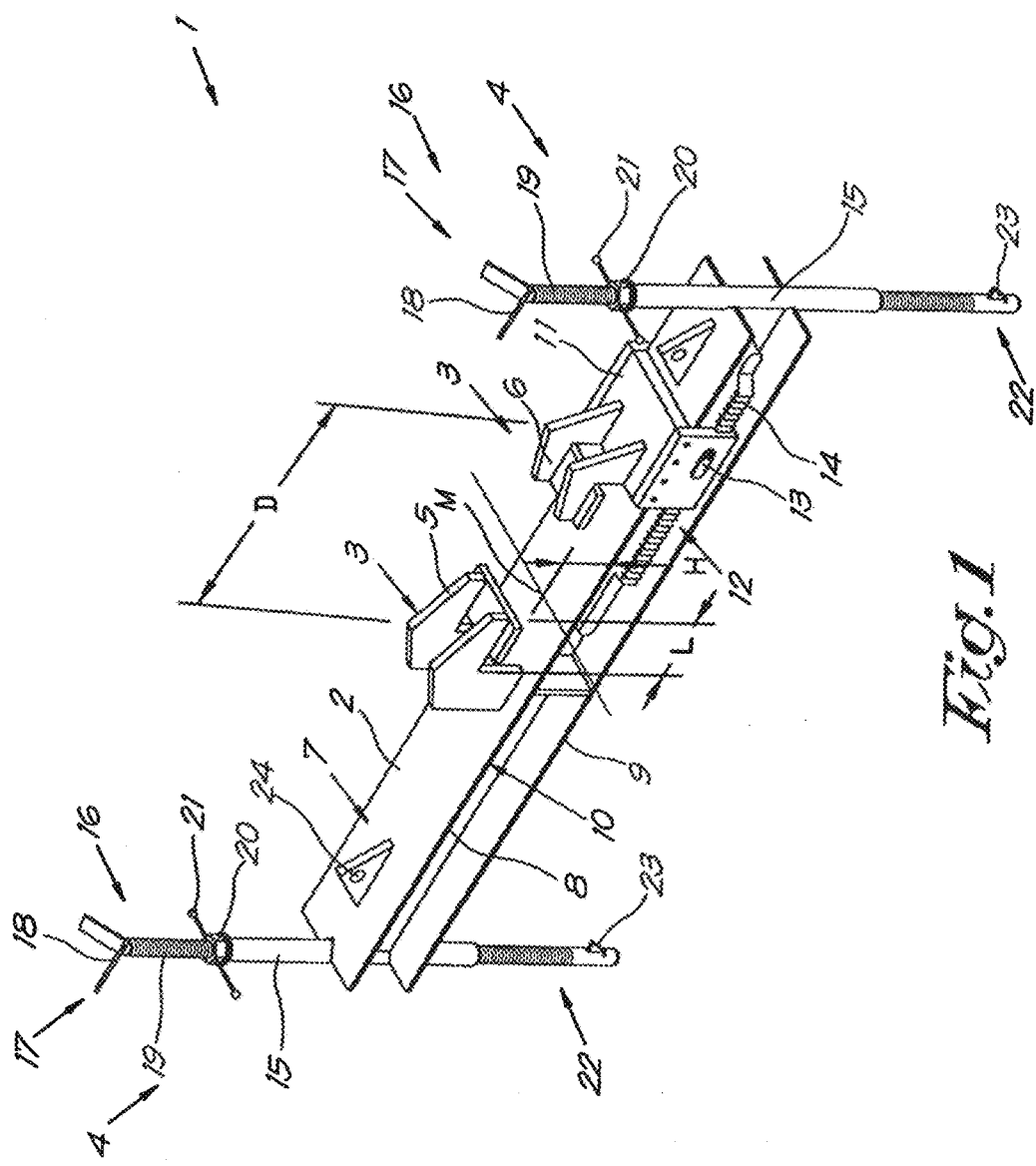

The lifting device according to the invention shown in FIG. 1 is intended for lifting a tube or pipeline with respect to a supporting girder with an H profile or I profile.

To this end the lifting device 1 is primarily constructed with a supporting body 2 whereby there are gripping means 3 centrally on the supporting body 2 and whereby lifting means 4 are also affixed to the supporting body 2 on either side of the gripping means 3.

In this case, the supporting body 2 of the lifting device 1 is formed by a metal support beam 2 with an H profile or I profile, but this is not strictly necessary according to the invention and other embodiments in which the supporting body 2 takes on another form, such as a cylinder or similar for example, are not excluded from the invention.

As will be described hereinafter, the support beam 2 acts as a support for the lifting means 4 when lifting a tube or pipeline, hence the name.

In the embodiment discussed here the gripping means 3 are formed by a pair of hooks 5 and 6 oriented towards one another, whereby the distance D between these hooks 5 and 6 is adjustable.

In this case the hooks 5 and 6 are affixed to the outside 7 of one of the flanges 8 and 9 of the support beam 2.

The clear height H between the hook ends and the outside 7 of the flange 8 is preferably somewhat greater, but not by too much, than the thickness of a flange of the girder with an H profile from which the device 1 has to be suspended.

Moreover the length L of these hook ends is preferably also somewhat greater than the half width of this girder.

A first hook 5 of the pair of hooks 5 and 6 is immovably affixed to the flange 8 of the support beam 2, more or less at a distance L from the centre M of the support beam 2.

This can be realised for example by welding the hook 5 onto the support beam 2, but such a hook 5 can be just as well screwed onto the support beam 2 or secured with other means.

In this case, the other hook 6 is movably affixed to the support beam 2.

To this end the girder has a guide 10 over which the base 11 of the movable hook 6 can slide.

In this case the aforementioned guide 10 is formed by the edges 10 of this flange 8 of the support beam 2, but of course many other embodiments are possible.

Moreover the lifting device 1 has releasable locking means 12, such that at least a movement of the movable hook 6 in a direction away from the other hook 5 can be prevented.

In the case of FIG. 1 discussed here, these releasable locking means 12 are formed by a spring-loaded tiltable pawl 13 that engages with a ratchet 14.

When the pawl 13 is not operated by the user, a spring presses it into the ratchet 14.

The toothing of the ratchet 14 is sawtooth shaped, whereby the backs of the sawtooth are inclined in the direction of the fixed hook 5.

In this way, when the movable hook 6 is moved towards the fixed hook 5, the pawl 13 can move without difficulty over this sawtoothed toothing of the ratchet 14 without the intervention of the user, while for a movement in the opposite direction the elastic force that pushes the pawl 13 into the ratchet 14 has to be removed by the user.

The lifting means 4 are formed by a pair of screw jacks 4, whereby each screw jack 4 is affixed to an end of the support beam 2.

In the example shown, the screw jacks 4 consist of a hollow, cylindrical screw jack base 15 that is immovably affixed to the support beam 2, and which acts as a guide 15 for a jack rod 16 that is affixed in the screw jack base 15 and can move up and down.

In this case, at one end 17, each jack rod 16 has a V-shaped head 18, in order to easily support a tube to be lifted with the jack rod 16.

The jack rods 16 are also provided with a screw thread 19 around which a nut 20 is affixed.

In this case these nuts 20 are provided with arms 21 in order to be able to easily turn them by hand.

When using the lifting device 1, the jack rod 16 rests on the screw jack base 15 via the nut 20.

By turning the nut 20 of a screw jack 4, the jack rod 16, depending on the turn direction, is moved in or out of the screw jack base 15, so that the distance E between the head 18 of the jack rod 16 and the screw jack base 15 is adjustable.

In the example shown in FIG. 1, the jack rods 16, at their end 22 opposite the end 17, are equipped with an outward-springing locking pawl 23 similar to an umbrella button, which prevents a jack rod 16 being able to move out of the screw jack base 15 without the intervention of the user, and whereby the maximum allowed distance E between the screw jack base 15 and the head 18 when lifting a tube can also be set.

In the embodiment shown in FIG. 1 the device also has an eye 24 at each end, and these eyes 24 can be used to attach a safety cable or similar.

It is clear that the embodiment of a lifting device, 1 according to the invention shown in FIG. 1 is only one of the many possibilities, and that for example the supporting body 2, the gripping means 3, the lifting means 4, the locking means 12 and so on, can be constructed entirely differently without departing from the scope of the invention.

For example it is not ruled out that both hooks 5 and 6 can be moved. It is also possible to provide gripping means 3 with gripping arms of an entirely different form, with which the lifting device 1 can be clamped over an H-shaped or I-shaped profile of a girder 26, for example as a scissor-like or pincer-like mechanism and so on.

The locking means 12 can for example consist of screwing means with which the hooks 5 and 6 can be screwed securely in the desired positions.

The use of a lifting device 1 according to the invention is very simple and is shown hereinafter on the basis of FIGS. 2 to 8 inclusive for the case in which a pipeline is lifted with respect to its support for the purpose of repairing a damaged zone and/or affixing a pipe shoe in order to reduce the risk of wear or damage to the pipeline that can occur as a result of a movement of a part of the pipeline on its support.

Figure 2:
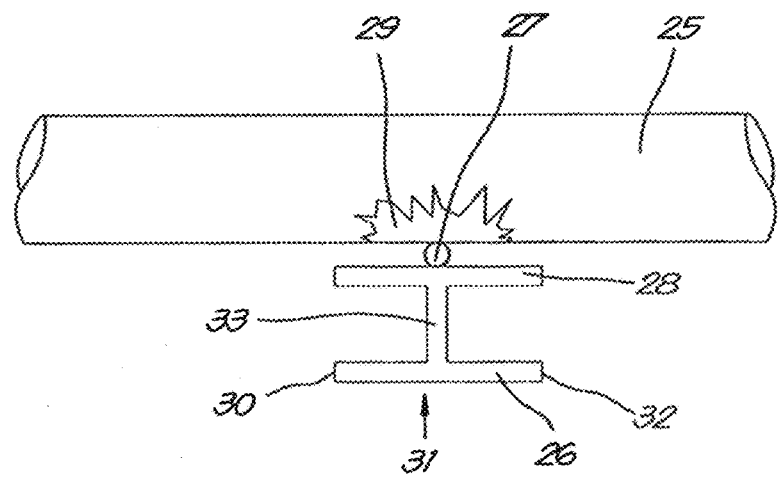

FIG. 2 schematically shows a side view of a pipeline 25 that is supported by a girder 26 with an H-shaped transverse section.

The contact between the pipeline 25 and the girder 26 is realised via a round bar 27 provided on the supporting flange 28 of the girder 26, as is often the case in practice.

As a result of a change of length of the pipeline 25 due to temperature changes, a zone 29 of the pipeline 25 around the support is very sensitive to damage over time, or this sensitive zone 29 is already damaged.

Before starting to affix the lifting device 1 according to the invention to the supporting girder 26 of the pipeline 25, nuts 20 of the screw jacks 4 are preferably turned up against the V-shaped jack heads 18, so that the jack rods 16 can sink as deeply as possible into the screw jack bases 15.

Figure 3:
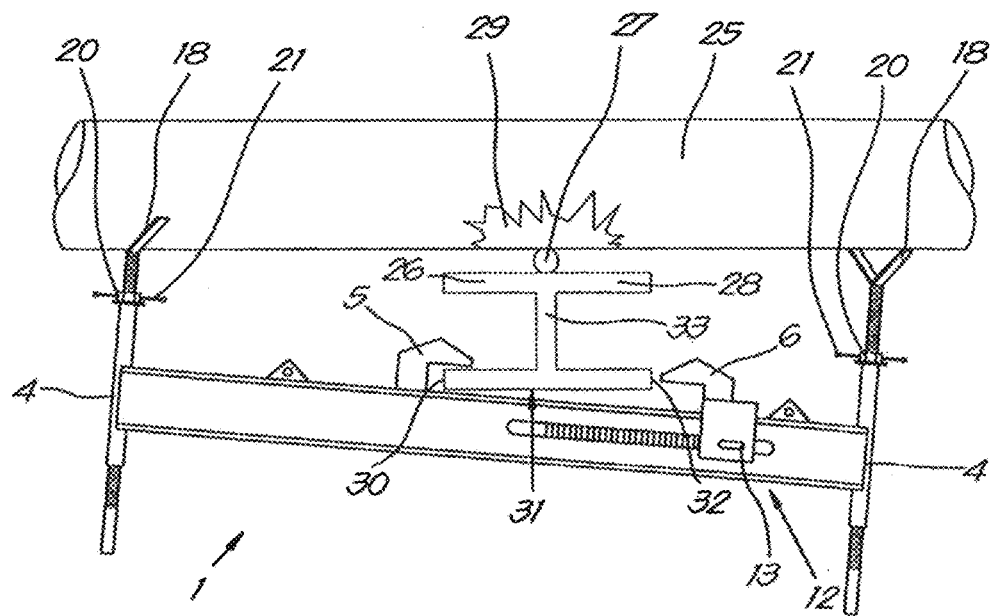

As shown in FIG. 3, a first step consists of affixing the lifting device 1 according to the invention to the girder 26 under the pipeline 25, hooking the fixed hook of the lifting device 1 over a free side edge 30 of the flange 31 of the girder 26, which is the furthest away from the pipeline.

In a horizontal arrangement of the pipeline 25, the flange 31 is of course the bottom flange 31 of the girder 26.

After that the other movable hook 6 of the lifting device 1 can be slid over the opposite free side edge 32 of the bottom flange 31, preferably up to the flange connection 33 of the girder 26, so that the hooks 5 and 6 firmly clamp into the girder 26 and the lifting device 1 is thus suspended from the bottom free flange 31 of the girder 26.

The locking means 12 ensure that the movable hook 6 stays in place as long as the pawl 13 is not released.

Figure 4:
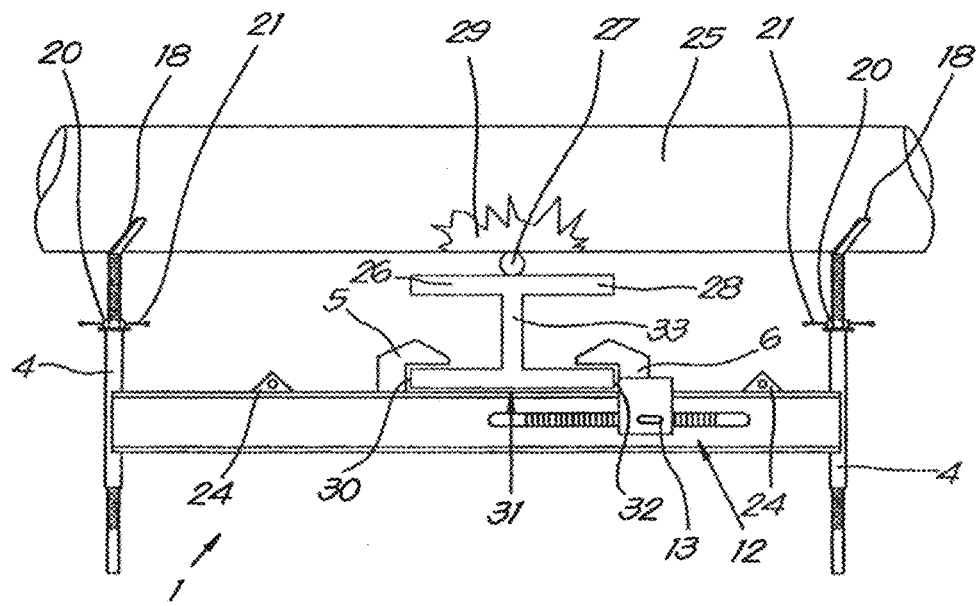

This situation is shown in FIG. 4.

Figure 5:
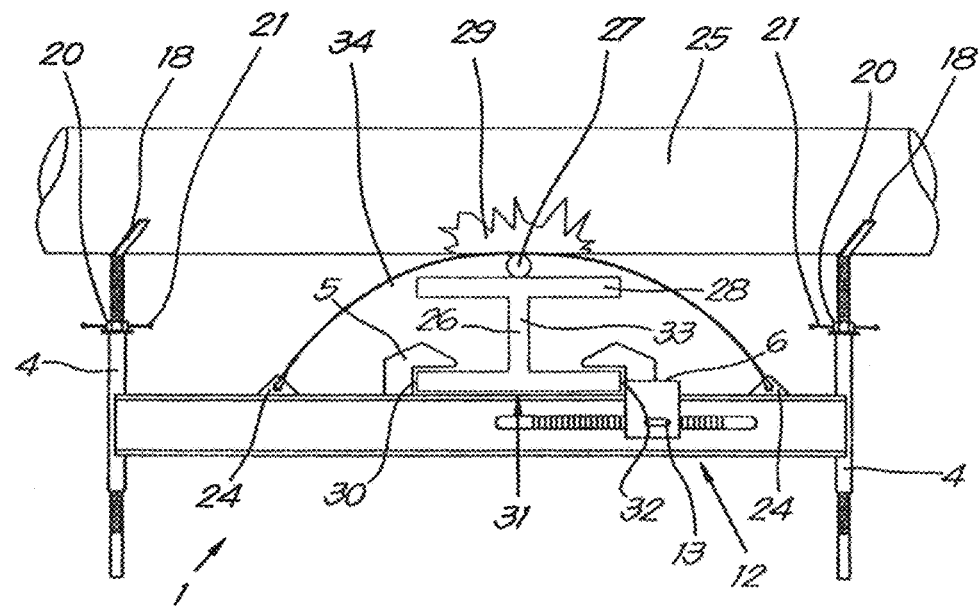

As illustrated on the basis of FIG. 5, a safety belt 34 can be attached to the eyes 24 of the lifting device 1, and after suspending the lifting device 1 from the girder 26 this safety belt 34 is preferably strapped over the girder 26.

Such a safety belt 34 is intended to prevent the lifting device 1 detaching from the girder 26 and falling, if the lifting device 1 is neglected by an installer and the locking means 12 are released after a long time due to circumstances.

On the other hand such a safety belt 34 can also be constructed such that it can act as a sling for carrying the lifting device 1 according to the invention.

As shown in FIG. 6, after affixing the lifting device 1 to the girder 26, the jack rods 16 can be screwed out of the screw jack bases 15 by turning the nuts 20, in order to lift the pipeline 25 from the supporting girder 26.

In this way the sensitive or damaged zone 29 comes free and this zone 29 can be inspected, for example by measuring the wall thickness of the pipeline 25, and the zone 29 can also be repaired and/or painted or similar if need be.

After having performed a repair or otherwise, a pipe shoe 35 can be affixed over the zone 29, as shown on the basis of FIG. 7, with the aim of protecting the sensitive zone 29 against wear due to a change of length of the pipeline 25.

Such a pipe shoe 35 is typically provided with a support plate 36 to support the pipeline 25 on the girder 26, and this support plate 36 is more resistant to the friction resulting from a movement over the round bar 27, for example on account of the fact that the load of the pipeline 25 is spread over a larger area by the support plate 36, or because the material that the support plate 36 is made from is more suitable for this purpose.

This support plate 36 is secured to the pipeline 25 by means of securing brackets 37.

After the pipeline 25 has been repaired and/or fitted with a pipe shoe 35, the pipeline 25 can again be lowered by loosening the nuts 20 in the corresponding direction until the pipeline 25 again rests on the girder 26 and the lifting device 1 can be taken away from the girder 26 by releasing the pawl 13 of the locking means 12.

Figure 8:
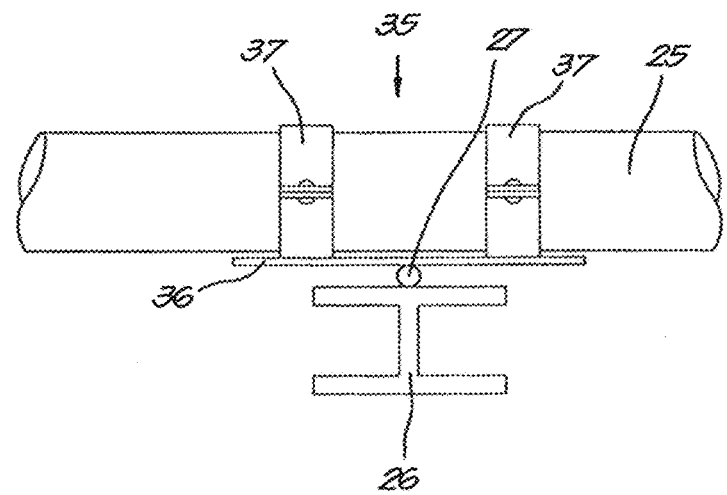

The situation obtained is shown in FIG. 8.

It is clear that a lifting device 1 according to the invention can be used very efficiently and that it is easy to operate by one single person, as set out in the introduction.

Figure 9:
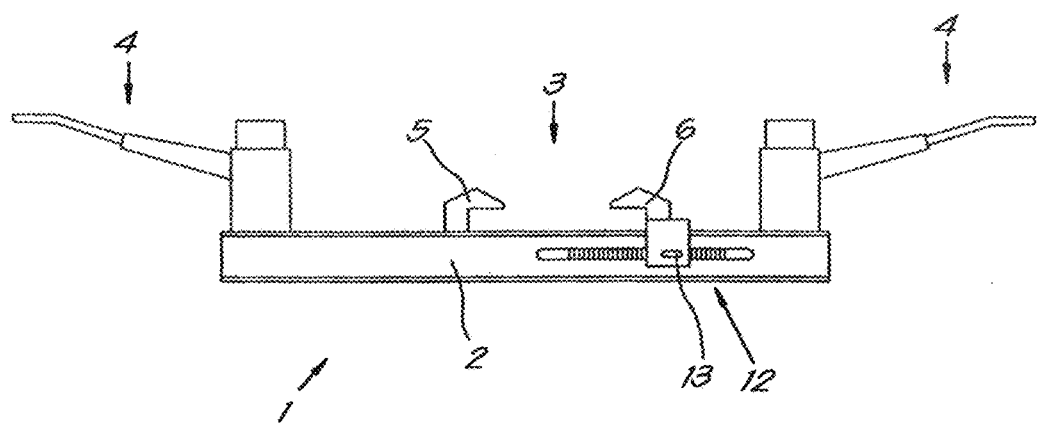
FIG. 9 shows another embodiment of a lifting device according to the invention.

By way of an example, FIG. 9 shows another embodiment of a lifting device 1 according to the invention, that is also constructed as a hand-operated lifting device 1, but whereby the screw jacks 4 are constructed as hydraulic jacks 4.

Of course this changes nothing essential in the invention. This embodiment of a lifting device 1 according to the invention can enable larger loads to be lifted than the previous embodiment.

As an alternative the screw jacks 4 can also be provided with a pneumatic or electrical drive or similar.

Figure 10:
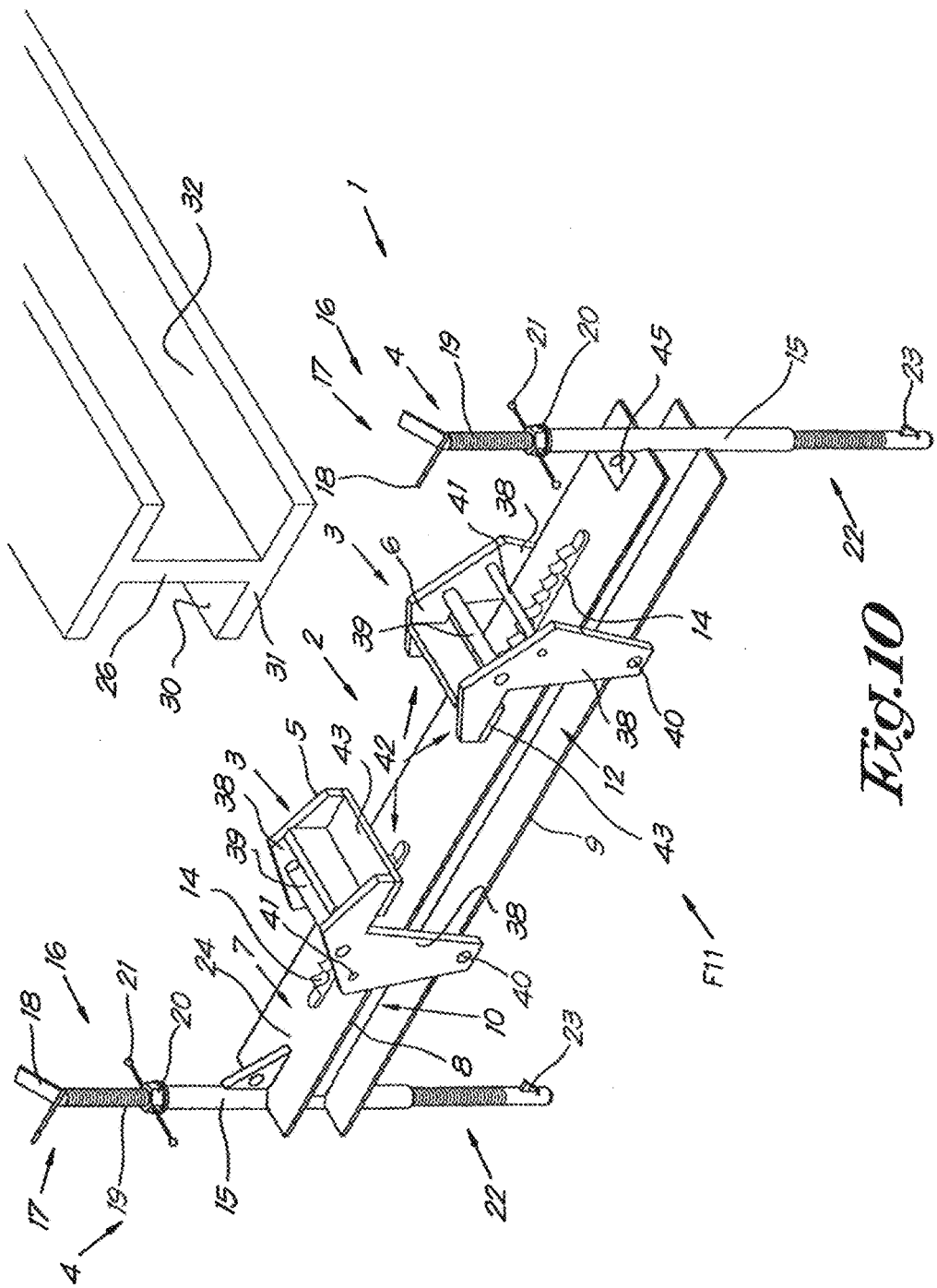
FIG. 10 shows another embodiment of a lifting device according to the invention.

FIG. 10 shows another embodiment of a lifting device 1 according to the invention, whereby this time the two hooks 5 and 6 are affixed movably on the support beam 2 of the device 1.

In this case the releasable locking means 12 to lock and then release the hooks 5 and 6 are also constructed somewhat differently.

More specifically the support beam 2 is equipped on the outside 7 of the flange 8 with a pair of ratchets 14, whereby each hook 5 and 6 is affixed over one of these ratchets 14.

Figure 11:
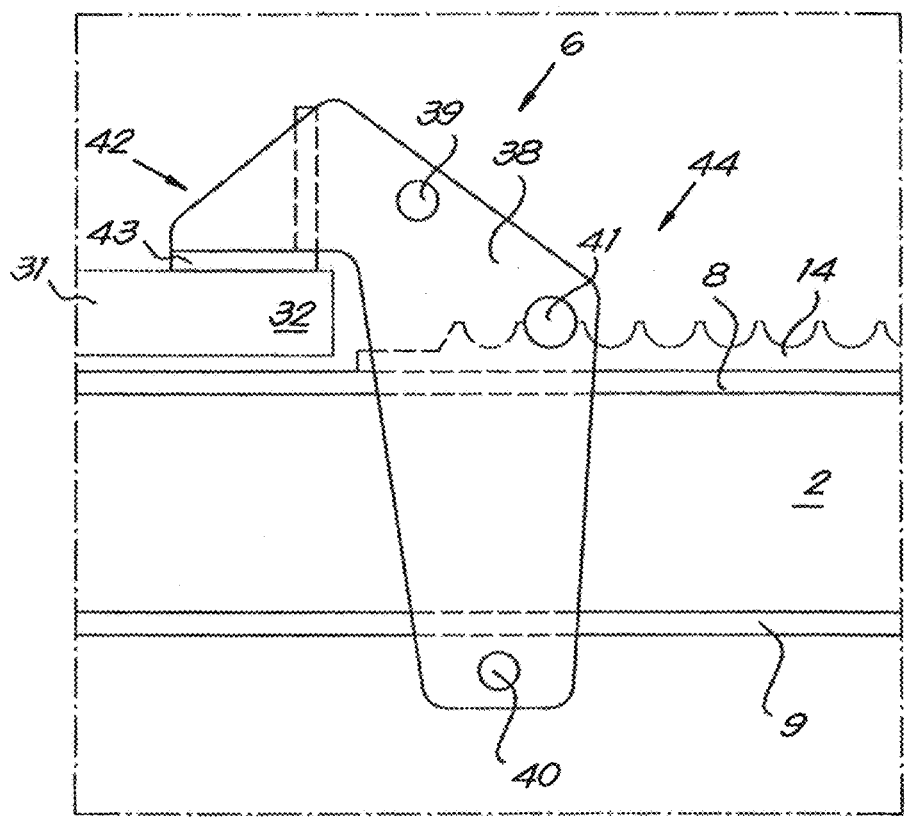
FIG. 11 shows a side view on a larger scale according to arrow F11 of FIG. 10.
Figure 15:
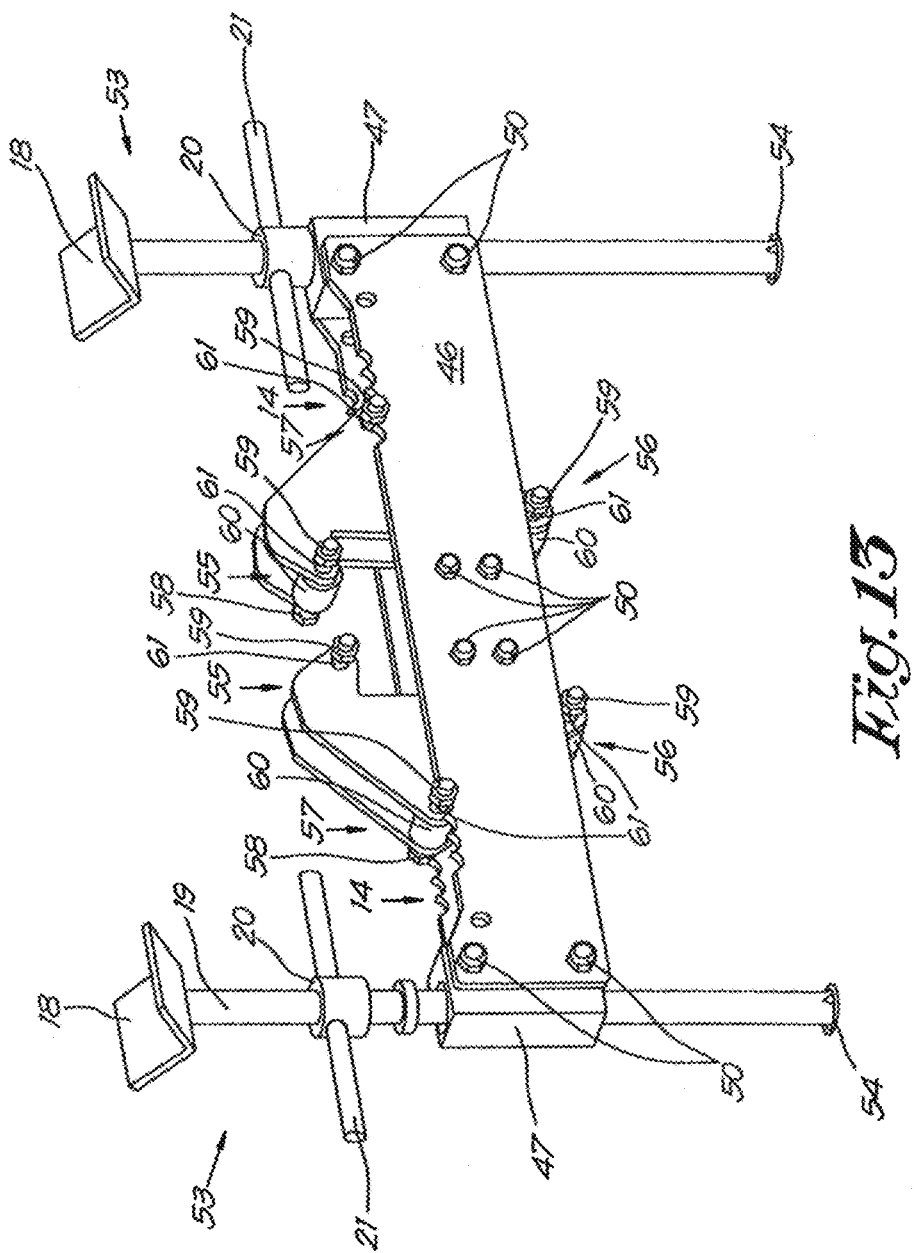

The ratchets 14 are constructed with toothing of a circular profile, as shown in more detail in FIG. 11.

Moreover the hooks 5 and 6 are constructed from two flanks 38 that are connected together by means of two outermost connecting rods 39 and 40 and an intermediate connecting rod 41.

The hook ends 42 themselves are also connected by a small support plate 43 whereby the hook ends 42 can rest on the flange 31 of a girder 26 during the use of the lifting device 1.

The flanks 38 of the hooks 5 and 6 extend over the support beam 2 and the support beam 2 is affixed with sufficient play between the outermost connecting rod 40 and the intermediate connecting rod 41.

The intermediate connecting rod 41 of each hook 5 and 6, moreover, has a circular cross-section that matches the circular toothing of the ratchets 14, such that each hook 5 and 6 can be hooked in this toothing.

For simplicity in this case only one ratchet 14 has been drawn per hook 5 or 6, but in practice it can be better to affix a pair of ratchets 14 parallel to one another per hook 5 or 6, or to construct such a ratchet 14 with a width that practically corresponds to the available width between the flanks 38.

As a result of the play with which the support beam 2 is affixed between the connecting rods 40 and 41, each hook 5 and 6 can be locked at any desired position to clamp into a flange 31 of a girder 26. The locking or bolting of the hooks 5 and 6 in the ratchets 14 occurs automatically.

To this end the hooks 5 and 6 are constructed such that the intermediate connecting rod 41 extends between the flanks 38 to the side 44 of the hooks 5 and 6 opposite the hook ends 42, while the two outermost connecting rods 39 and 40 extend between the flanks 38 more or less at the level of a vertical through the centre of the flanks 38, at least insofar the lifting device 1 is placed in a horizontal position.

After moving the hooks 5 and 6 to the desired position over a side edge 30 and 32 of the flange 31 of a girder 26, whereby the intermediate connecting rod 41 comes to rest at a certain position between the teeth of the ratchet 14 concerned, the lifting device 1 is released to allow it to hang from the girder 26.

As a result the hooks 5 and 6 will automatically tilt (turn in the clockwise direction in the case of FIG. 11), such that the support beam 2 of the lifting device 1 is automatically held against the girder 26 by a clamping action between the outermost connecting rod 40 and the hook ends 42 on the one hand, and between the outermost connecting rod 40 and the intermediate connecting rod 41 on the other.

An advantage of this embodiment of a device 1 according to the invention is that, irrespective of the width of the flange 31 of a girder 26, the hooks 5 and 6 can always be positioned such that the girder 26 is clamped in the middle between the two lifting means 4.

Moreover the suspension of the lifting device 1 over the girder 26 can be done very quickly and it is a very safe suspension method, as the clamping is automatic and does not depend on complicated mechanisms.

In this case, the eyes 24 for attaching a safety belt 34 or similar are constructed as eyes 24 in small plates 45 that are welded as an extra support between the bases 15 of the screw jacks 4 and the support beam 2, such that a sturdier construction is obtained than with the previous embodiment.

FIGS. 12 and 13 show another embodiment of a lifting device 1 according to the invention.

In this embodiment, the supporting body 2 is constructed from two longitudinal side plates 46 that are placed parallel to one another and which are kept at a distance F from one another by intermediate parts.

In this case these intermediate parts are formed on the one hand by spindle holders 47 fitted at the long ends of the side plates 46, and on the other by a cylindrical intermediate part 48 in the middle of the side plates 46.

The side plates 46, the spindle holders 47, and the centre part 48 are moreover connected together by means of bolts 49 and nuts 50 that are fitted through holes 51 in the spindle holders 47 and the side plates 46.

The spindle holders 47 are also each provided with a cylindrical opening 52, which, during the normal use of the lifting device 1 are oriented vertically, and whereby through these cylindrical openings 52 a spindle 53 is affixed, which moreover is completely analogously constructed as the jack rods 16 in the embodiment of a lifting device 1 according to the invention discussed above.

More specifically, each spindle 53 is equipped with an external screw thread 19 over which a nut 20 with arms 21 is screwed, and this nut 20 rests on the spindle holder 47.

Moreover, the head 18 of each spindle 53 is V-shaped with the intention of being able to easily support a pipeline 25.

In order to avoid a spindle 53 being able to move unintentionally out of the cylindrical opening 52 in the spindle holder 47, in this case at the bottom of each spindle 53 there is a clip 54 on the end 22 opposite the head 18.

The hooks 5 and 6 are constructed according to the same principle as in the embodiment of FIGS. 10 and 11.

These hooks 5 and 6 also have two flanks 38 that are connected together by means of outermost connecting elements 55 and 56, as well as by means of an intermediate connecting element 57.

However, the hooks 5 and 6 are constructed somewhat differently to the foregoing embodiment, as in this case they are intended to be affixed between the side plates 46 of the supporting body 2 of the lifting device 1.

Of course, to this end the flanks 38 are placed at a distance apart that is less than the distance F between the side plates 46 of the lifting device 1.

Moreover, the connecting elements 55, 56 and 57 are not constructed as simple rods, and these connecting elements 55, 56 and 57 extend on either side by a certain length outside the flanks 38 of each hook 5 or 6.

Each aforementioned connecting element 55, 56 or 57 is provided with a bolt 58 that is affixed through holes in the flanks 38, on which a nut 59 is affixed, whereby between the flanks 38 there is a bush or roller 60 over the bolt and on which a small roller or bush 61 is also affixed on either side at the sides of the flanks 38 located towards the outside.

In the example shown the outermost connecting elements 55 of each hook 5 or 6 are each fitted in the tip concerned of the hooks 5 and 6 oriented towards one another.

This ensures that the bush or roller 60 between the flanks 38 of these outermost connecting elements 55 in the tips of the hooks 5 and 6 have a sufficiently large diameter, such that the roller or bush 60 somewhat protrudes outside the outline of the flanks 38 of the hooks 5 and 6.

The rollers or bushes 60 of the outermost connecting element 55 at the tips of the hooks 5 and 6 thus form a guide in order to facilitate hooking when hooking the lifting device 1 over a flange 31 of a girder 26, as well as a sturdy support over which the lifting force that is needed to lift a pipeline 25 is distributed evenly.

Preferably the rollers or bushes 60 concerned are preferably manufactured from a hard material, such as stainless steel or similar for example.

The locking means 12 to lock the hooks 5 and 6 on the supporting body 2 of the lifting device 1 in this case are also constructed in the form of ratchets 14.

To this end each side plate 46 is provided with a pair of toothings or serrations 14 on one of its edges.

Hereby the edges of the side plates 46 are constructed symmetrically with respect to a plane of symmetry parallel to the side plates 46 and located between the side plates 46, as well as with respect to a plane perpendicular to the aforementioned plane of symmetry through the centre of each side plate 46.

In this case each such toothing 14 consists of five semi-circular notches in which small rollers or bushes 61 of the hooks 5 and 6 can rest.

The ends of the bolts 58, as well as the nuts 59 of the connecting elements 55, 56 and 57 form a widening of the connecting elements 55, 56 and 57 with which the hooks hook over the edges of the side plates 46, so that a hook 5 or 6 can move smoothly between the side plates 46 and over these edges of the side plates 46, and a hook 5 or 6 can be hooked in a simple way in the ratchets 14.

It is clear that this embodiment of a lifting device 1 according to the invention can be used completely analogously to the foregoing embodiment of FIGS. 10 and 11.

A great advantage of a lifting device 1 according to this embodiment is however that it can have a very light construction, but with optimum strength in order to be able to withstand the forces that occur when lifting a pipeline 25.

The fact that the spindle holders 47 are affixed between the side plates 46 for example and that they form the actual supporting body 2, ensures a very strong but light construction.

FIG. 14 schematically shows another possible variant of a lifting device 1 according to the invention, which is a simpler and lighter embodiment intended to lift lighter pipelines 25.

In this embodiment the gripping means 3 are still formed by two hooks 5 and 6, but the one hook 5 is immovably affixed on the supporting body 2, while the position of the other hook 6 can vary over the length of the supporting body 2.

The hook 6 is hereby affixed over a threaded rod 62 that extends along the length of the supporting body 2.

This threaded rod 62 is rotatably affixed with respect to the supporting body 2 and a handle 63 is also hinged to one end 64 of the threaded rod 62, so that a user can easily exert a sufficiently large torque to turn the threaded rod 62 and in this way can easily position the hook 6 on the supporting body 2 to grip a pipeline 25.

The lifting means 4 of the lifting device 1 in this case are formed by just one spindle 53, that is fitted at the other end 65 of the supporting body 2 opposite the handle 63.

When the tubes or pipelines 25 are not too heavy, for example tubes with a diameter varying from around ¼ inch to 4 inches, it is indeed possible to lift tubes with the aid of only one spindle 53.

It is clear that if the application concerns such lighter tubes, this last embodiment is then preferred.

In the example shown, the spindle 53 is constructed such that the spindle 53 can be adjusted between a position for use, and a position for storing the lifting device 1.

To this end a spindle holder 47 of the spindle 53 is hinged to the supporting body 2 around a shaft 66, whereby the shaft 62 is also affixed in a slot 67 of the spindle 53, whereby the spindle 53 can also be moved back and forth to a certain extent with respect to the shaft 66.

In this way the spindle holder 47 can be placed in a position for use, whereby the cylindrical opening 52 in the spindle holder 47 and the jack rod 16 that is affixed in it, extend transversely along the length of the supporting body.

On the other hand, the spindle holder 47 can also be tilted by a combination of a rectilinear movement in the slot 67 and a rotation around the shaft 66 to a position whereby the cylindrical opening 52 and the jack rod 16 extend along the length of the supporting body 2 and whereby the spindle holder 47 can be slid into the supporting body, so that a compact whole is obtained for the storage of the lifting device 1.

In order to be able to handle the lifting device easily, it is also equipped with a handgrip 68.

The present invention is by no means limited to the embodiments of a lifting device 1 according to the invention described as an example and shown in the drawings, but a lifting device 1 according to the invention can be realised in all kinds of variants, without departing from the scope of the invention.

The invention claimed is:

1. A lifting device suitable for lifting a tube or pipeline with respect to a supporting beam with an H profile or I profile, comprising:
   a supporting body;
   gripping means on the supporting body that can grip over opposite side edges of a free flange of the supporting beam, and with which the supporting body can be suspended from this free flange of the supporting beam with an H profile or I profile;
   a pair of jacks provided on the supporting body on either side of the gripping means, wherein each jack is affixed to one end of the supporting body and is movable with respect to the supporting body such that the tube or pipeline can be lifted with respect to the supporting body; and
   a head provided at an upper end of each jack, each head configured, when the supporting body is suspended from the free flange, to support a tube or pipeline to be lifted by the jacks,
   wherein the gripping means are formed by hooks having a base and an arm, the arms of the hooks extending towards one another, whereby the distance between the hooks is adjustable, wherein the pair of jacks are a pair of screw jacks, whereby each screw jack is affixed to one end of the supporting body, and wherein the screw jacks are equipped with a hydraulic, pneumatic or electrical drive.

2. The lifting device of claim 1, wherein at least one of the hooks is movably affixed to the supporting body and is equipped with releasable locking means whereby at least a movement of the movable hook away from the other hook can be prevented.

3. The lifting device of claim 2, wherein the releasable locking means are formed by a spring-loaded tiltable pawl that engages with a ratchet.

4. The lifting device of claim 2, wherein the supporting body is equipped with a guide, in which or over which the base of at least one movable hook can be slid.

5. The lifting device of claim 1, wherein both hooks are movably affixed to the supporting body.

6. The lifting device of claim 1, wherein the supporting body is formed by a support beam with an H profile or I profile.

7. The lifting device of claim 1, wherein the hooks are constructed from two flanks that are connected together by means of two outermost connecting rods and an intermediate connecting rod, whereby the flanks of the hooks extend over the supporting body and the supporting body is affixed between the outermost connecting rod and the intermediate connecting rod.

8. The lifting device of claim 7, wherein there is a pair of ratchets on the supporting body, whereby each hook is affixed over one of these ratchets.

9. The lifting device of claim 8, wherein the intermediate connecting rod of each hook extends between the flanks at the side of the hook concerned opposite the hook ends, while the two outermost connecting rods of each hook extend between the flanks more or less at the level of a vertical through the centre of the flanks, at least insofar the lifting device is placed in a horizontal position.

10. The lifting device of claim 1, wherein each one of the pair of screw jacks comprises a hollow, cylindrical screw jack base that is immovably affixed to the supporting body and which acts as a guide for a jack rod that is affixed in the screw jack base and can be moved up and down.

11. The lifting device of claim 10, wherein the jack rod has a screw thread around which there is a nut, whereby the distance between the head of the jack rod and the screw jack base can be adjusted by turning the nut.

12. A lifting device suitable for lifting a tube or pipeline with respect to a supporting beam with an H profile or I profile, comprising:
- a supporting body;
- gripping means on the supporting body that can grip over opposite side edges of a free flange of the supporting beam, and with which the supporting body can be suspended from this free flange of the supporting beam with an H profile or I profile;
- a pair of jacks provided on the supporting body on either side of the gripping means, wherein each jack is affixed to one end of the supporting body and is movable with respect to the supporting body such that the tube or pipeline can be lifted with respect to the supporting body; and
- a head provided at an upper end of each jack, each head configured, when the supporting body is suspended from the free flange, to support a tube or pipeline to be lifted by the jacks,
- wherein the gripping means are formed by hooks having a base and an arm, the arms of the hooks extending towards one another, whereby the distance between the hooks is adjustable, and
- wherein each one of the pair of jacks includes a screw thread around which a nut with an arm is affixed, the arm configured to be operated by hand to turn the nut.

13. A lifting device for lifting a tube or pipeline with respect to a girder with a free flange comprising:
- a support beam;
- hooks having a base and an arm, the arms of the hooks extending towards one another on the support beam, which hooks can grip over opposite side edges of the free flange of the girder, and with which the support beam can be suspended from this free flange of the girder; whereby the distance between the hooks is adjustable, wherein at least one of the hooks is movably affixed to the support beam and is equipped with releasable locking means;
- lifting jacks provided on the support beam on either side of the hooks and movable with respect to the supporting body such that the tube or pipeline can be lifted with respect to the support beam; and
- a head provided at an upper end of each jack, each head configured, when the supporting body is suspended from the free flange, to support a tube or pipeline to be lifted by the jacks, wherein each head is V-shaped.

14. The lifting device of claim 13, wherein the support beam is equipped with a guide, in which or over which a base of at least one movable hook can be slid.

15. A lifting device suitable for lifting a tube or pipeline with respect to a supporting beam with an H profile or I profile, comprising:
- a supporting body;
- gripping means on the supporting body formed by hooks having a base and an arm, the arms of the hooks extending towards one another such that the hooks can grip over opposite side edges of a free flange of the supporting beam, and with which the supporting body can be suspended from this free flange of the supporting beam with an H profile or I profile;
- a pair of jacks provided on the supporting body on either side of the gripping means, wherein each jack is affixed to one end of the supporting body and is movable with respect to the supporting body such that the tube or pipeline can be lifted with respect to the supporting body; and
- a head provided at an upper end of each jack, each head configured, when the supporting body is suspended from the free flange, to support a tube or pipeline to be lifted by the jacks,
wherein each head is V-shaped.

* * * * *